United States Patent
Koss et al.

(10) Patent No.: US 9,644,840 B2
(45) Date of Patent: May 9, 2017

(54) METHOD AND DEVICE FOR CLEANING AN INDUSTRIAL WASTE GAS COMPRISING $CO_2$

(71) Applicant: ALSTOM Technology Ltd, Baden (CH)

(72) Inventors: Ulrich Koss, Baden (CH); Glen D. Jukkola, Glastonbury, CT (US)

(73) Assignee: General Electric Technology GmbH, Baden (CH)

( * ) Notice: Subject to any disclaimer, the term of this patent is extended or adjusted under 35 U.S.C. 154(b) by 498 days.

(21) Appl. No.: 13/623,521

(22) Filed: Sep. 20, 2012

(65) Prior Publication Data

US 2014/0080071 A1 Mar. 20, 2014

(51) Int. Cl.
F23D 14/00 (2006.01)
F23G 7/06 (2006.01)
(Continued)

(52) U.S. Cl.
CPC ............ *F23G 7/061* (2013.01); *B01D 53/52* (2013.01); *B01D 53/62* (2013.01); *B01D 53/72* (2013.01);
(Continued)

(58) Field of Classification Search
CPC ................ F23G 5/12; F23G 5/14; F23G 5/16
(Continued)

(56) References Cited

U.S. PATENT DOCUMENTS 1,746,464 A 2/1930 Fischer et al.
4,265,088 A 5/1981 Funk
(Continued)

FOREIGN PATENT DOCUMENTS

DE 3924908 A1 1/1991
EP 0 162 536 11/1985
(Continued)

OTHER PUBLICATIONS

Castaldini, Carlos. Mason, Howard. DeRosier, Robert. DeRos, Bruce. "Full-Scale boiler emissions testing of hazardous waste cofiring". Incineration and Treatment of Hazardous Waste, Proceedings of the Ninth Annual Symposium. Jul. 1984.*
(Continued)

*Primary Examiner* — Avinash Savani
*Assistant Examiner* — Vivek Shirsat
(74) *Attorney, Agent, or Firm* — GE Global Patent Operation; Cynthia W. Flanigan

(57) ABSTRACT

A gas treatment plant (3) for treating an industrial waste gas comprising carbon dioxide comprises an oxyfuel boiler (100) and a pipe (109; 122; 180) arranged for forwarding the industrial waste gas to the oxyfuel boiler (100) and injecting the industrial waste gas into the oxyfuel boiler (100) to participate in the combustion process occurring in the boiler (100) to cause oxidation of at least a portion of the content of at least one oxidizable substance of the industrial waste gas. The gas treatment plant (3) further comprises a gas cleaning system (108), and a pipe (126) for forwarding a carbon dioxide rich flue gas generated in the boiler (100) to the gas cleaning system (108) for being cleaned therein, such that an at least partly cleaned carbon dioxide rich flue gas is formed.

19 Claims, 3 Drawing Sheets

(51) Int. Cl.
| | |
|---|---|
| *F23G 5/08* | (2006.01) |
| *F23J 15/04* | (2006.01) |
| *F23L 7/00* | (2006.01) |
| *F23G 5/46* | (2006.01) |
| *B01D 53/52* | (2006.01) |
| *B01D 53/62* | (2006.01) |
| *B01D 53/72* | (2006.01) |
| *B01D 53/75* | (2006.01) |
| *B01D 53/50* | (2006.01) |
| *B01D 53/58* | (2006.01) |
| *B01D 53/64* | (2006.01) |
| *B01D 53/86* | (2006.01) |

(52) U.S. Cl.
CPC .............. *B01D 53/75* (2013.01); *F23G 5/08* (2013.01); *F23G 5/46* (2013.01); *F23G 7/065* (2013.01); *F23J 15/04* (2013.01); *F23L 7/007* (2013.01); *B01D 53/507* (2013.01); *B01D 53/58* (2013.01); *B01D 53/64* (2013.01); *B01D 53/8625* (2013.01); *B01D 2251/102* (2013.01); *B01D 2252/2021* (2013.01); *B01D 2256/22* (2013.01); *B01D 2257/302* (2013.01); *B01D 2257/304* (2013.01); *B01D 2257/306* (2013.01); *B01D 2257/308* (2013.01); *B01D 2257/406* (2013.01); *B01D 2257/502* (2013.01); *B01D 2257/504* (2013.01); *B01D 2257/602* (2013.01); *B01D 2257/704* (2013.01); *B01D 2257/7022* (2013.01); *B01D 2257/7027* (2013.01); *B01D 2258/025* (2013.01); *B01D 2259/65* (2013.01); *F23G 2206/203* (2013.01); *F23J 2215/20* (2013.01); *F23J 2215/50* (2013.01); *F23J 2219/40* (2013.01); *Y02C 10/04* (2013.01); *Y02E 20/12* (2013.01); *Y02E 20/326* (2013.01); *Y02E 20/344* (2013.01)

(58) Field of Classification Search
USPC ....... 431/5, 202, 354; 60/272; 110/252, 215, 110/210, 345
See application file for complete search history.

(56) References Cited

U.S. PATENT DOCUMENTS

| | | | |
|---|---|---|---|
| 4,336,035 A | | 6/1982 | Evenstad et al. |
| 4,392,817 A | * | 7/1983 | Berlie .................. F23G 7/085 422/182 |
| 4,502,872 A | | 3/1985 | Ivester et al. |
| 5,508,013 A | * | 4/1996 | Kvasnikoff et al. .......... 423/220 |
| 5,628,977 A | | 5/1997 | Heisel et al. |
| 6,146,605 A | | 11/2000 | Spokoyny |
| 6,605,263 B2 | * | 8/2003 | Alix et al. .............. 423/243.06 |
| 7,005,115 B2 | * | 2/2006 | Harada et al. ................ 423/225 |
| 2007/0231758 A1 | * | 10/2007 | Harless ................... F23G 7/085 431/202 |
| 2008/0078122 A1 | | 4/2008 | Clark |
| 2008/0173585 A1 | * | 7/2008 | White .................. B01D 53/002 210/656 |
| 2010/0230296 A1 | * | 9/2010 | Northrop ...................... 205/637 |
| 2011/0280795 A1 | * | 11/2011 | Gupta ................... B01D 53/52 423/574.1 |
| 2012/0009109 A1 | * | 1/2012 | Wright et al. ............. 423/239.1 |

FOREIGN PATENT DOCUMENTS

| | | |
|---|---|---|
| EP | 2 457 637 | 5/2012 |
| GB | 1298434 | 6/1972 |
| WO | 2004/027220 | 1/2004 |
| WO | WO2005/007274 | 1/2005 |
| WO | 2007/079381 | 12/2008 |
| WO | 2010/019079 | 2/2010 |

OTHER PUBLICATIONS

Landfill Methane Outreach Program. "Adapting Boilers to Utilize Landfill Gas: An Enviormental and Economically Beneficial Opportunity" Dec. 2009.*

Extended European Search Report dated Dec. 14, 2012 (EP 12185191.9-1213).

* cited by examiner

METHOD AND DEVICE FOR CLEANING AN INDUSTRIAL WASTE GAS COMPRISING $CO_2$

FIELD OF THE INVENTION

The present invention relates to a method of treating an industrial waste gas generated in a chemical process and comprising at least 50% by volume of carbon dioxide and at least one oxidizable substance.

The present invention further relates to a gas treatment plant for treating an industrial waste gas of the above mentioned type.

BACKGROUND OF THE INVENTION

Many industrial processes generate waste gases comprising carbon dioxide, $CO_2$. Such waste gases may also contain further contaminants that need to be removed before the waste gas can be allowed to be released to the atmosphere, or can be re-used or sent for sequestration of the carbon dioxide. An example of an industrial process that generates waste gases comprising carbon dioxides, and also other contaminants, is the process for producing hydrocarbon products from a gas obtained by coal gasification, such process being known as, for example, the Fischer-Tropsch process, as disclosed in U.S. Pat. No. 1,746,464. Sometimes this and similar processes are referred to as "syngas" processes since they produce synthetic gases from a fuel, such as coal. Purifying and disposing of the waste gases generated in conjunction with syngas processes, and other industrial processes, is difficult and costly, which means that industrial plants operating such industrial processes often generates environmental and health problems.

SUMMARY OF THE INVENTION

An object of the present invention is to provide a method of cleaning an industrial waste gas containing carbon dioxide, the method being more efficient with respect to removal efficiency and/or operating costs compared to the prior art method.

This object is achieved by a method of treating an industrial waste gas generated in a chemical process and comprising at least 50% by volume of carbon dioxide and at least one oxidizable substance, the method comprising:

forwarding the industrial waste gas to an oxyfuel boiler plant, injecting the industrial waste gas into a boiler of the oxyfuel boiler plant and making the industrial waste gas participate in the combustion process occurring in the boiler to cause oxidation of at least a portion of the content of the at least one oxidizable substance of the industrial waste gas, generating a carbon dioxide rich flue gas in the boiler as an effect of the combustion process, and cleaning the carbon dioxide rich flue gas in a gas cleaning system of the oxyfuel boiler plant to form an at least partly cleaned carbon dioxide rich flue gas.

An advantage of this method is that the industrial waste gas is efficiently cleaned, and its content of at least one oxidizable substance is utilized for generating useful electrical power in the oxyfuel boiler plant. Hence, the method results in a cleaned gas and also in production of electrical power. A further advantage is that investment cost is low, since the industrial waste gas replaces, at least partly, carbon dioxide gas that is recirculated internally within the oxyfuel boiler. Thereby, the oxyfuel boiler plant treating the industrial waste gas can be of a similar size as an oxyfuel boiler of similar thermal capacity operating with only internal recirculation of carbon dioxide rich flue gas.

Preferably, the industrial waste gas comprises at least 75%, more preferably at least 90%, by volume of carbon dioxide. An advantage of this embodiment is that the unwanted dilution with other gases, such as water vapour, nitrogen gas, etc. is reduced, which reduces the size of, for example, equipment of the gas cleaning system.

According to one embodiment, at least 75% of the content of at least one oxidizable substance of the industrial waste gas stream undergoes oxidation when exposed to combustion in the oxyfuel boiler plant. An advantage of this embodiment is that the resulting flue gas may be particularly efficiently cleaned in the gas cleaning system.

According to one embodiment, the method further comprises utilizing at least a portion of the industrial waste gas as a first flow of dilution gas and mixing the at least a portion of the industrial waste gas with a fuel prior to injecting the at least a portion of the industrial waste gas mixed with the fuel into the boiler. An advantage of this embodiment is that using the industrial waste gas as dilution gas for fuel preparation, such as drying and/or milling coal, the need for another inert dilution gas, such as nitrogen or recirculated carbon dioxide, is reduced.

According to one embodiment, the method further comprises utilizing at least a portion of the industrial waste gas as a second flow of dilution gas and mixing the at least a portion of the industrial waste gas with an oxygen gas to form an oxidant gas mixture, and injecting the oxidant gas mixture into the boiler for combusting a fuel therein. An advantage of this embodiment is that using the industrial waste gas as dilution gas for oxidant gas preparation reduces the need for another inert dilution gas, such as recirculated carbon dioxide. According to one embodiment the resultant oxidant gas mixture comprises, upon entering the boiler, 15-50%, more preferably 15-30%, and most preferably 15-23.5%, by volume of oxygen gas. An advantage of limiting the concentration of oxygen gas to a maximum of 23.5% by volume of oxygen gas is that it allows the gas ducts in contact with the oxidant gas to be fabricated with carbon steel material and avoid the need for more costly stainless steel alloys required with higher oxygen gas concentrations. According to one embodiment, oxygen gas may, in part or in the whole, be forwarded directly to the boiler, for example for the purpose of operating the boiler at a higher oxygen gas concentration than what might be suitable for the mixture of industrial waste gas and oxygen gas. Thus, the oxidant gas mixture of oxygen gas and industrial waste gas could be formed upstream of the boiler and/or inside of the boiler. Hence, the oxidant gas mixture inside the actual boiler could comprise in the range of 15-75% by volume of oxygen gas. The oxidant gas mixture entering the boiler further comprises, preferably, 20-80%, more preferably 30-70%, by volume of carbon dioxide gas. It is normally preferable that the respective concentrations of oxygen gas and carbon dioxide gas are relatively high, and that the concentrations of other gases, such as water vapour, argon, nitrogen, etc., are relatively low, since the latter gases are merely a ballast, in particular if generation of a clean carbon dioxide stream is desired.

According to one embodiment the method further comprises forwarding the cleaned carbon dioxide rich flue gas formed in the gas cleaning system of the oxyfuel boiler plant to a gas processing unit for forming a clean carbon dioxide stream suitable for $CO_2$ sequestration and/or reuse. One example of a reuse is enhanced oil recovery (EOR). An advantage of this embodiment is that the carbon dioxide content of the industrial waste gas is handled in a manner which is economical and environmentally friendly.

According to one embodiment, the gas cleaning system comprises a wet scrubber for removing at least one acid substance from the carbon dioxide rich flue gas generated in the boiler. An advantage of this embodiment is that acid gases, such as sulphur dioxides, formed during the combustion of, for example, hydrogen sulphide of the industrial waste gas may be removed from the carbon dioxide rich flue gas. According to one embodiment an ammonia stream is forwarded to the wet scrubber for reacting with sulphur dioxide of the carbon dioxide rich flue gas to form ammonium sulphate. An advantage of this embodiment is that the hydrogen sulphide content of the industrial waste gas may, after oxidation to sulphur dioxide and subsequent capture in the wet scrubber, form a by-product that is useful as, for example, a fertilizer.

According to one embodiment, at least the industrial waste gas generated in a chemical process and comprising at least 50% by volume of carbon dioxide and at least one oxidizable substance is generated in a syngas plant and comprises, as one oxidizable substance, hydrogen sulphide, $H_2S$. An advantage of this embodiment is that syngas plants generate waste gases that have a high concentration of carbon dioxide, which makes them very suitable as dilution gases in an oxyfuel boiler, and hydrogen sulphide which is a contaminant posing large risks to health and environment.

It is a further object of the present invention to provide a gas treatment plant for cleaning an industrial waste gas containing carbon dioxide more efficiently with respect to removal efficiency and/or operating costs compared to the prior art plants.

This object is achieved by means of a gas treatment plant for treating an industrial waste gas generated in a chemical process and comprising at least 50% by volume of carbon dioxide and at least one oxidizable substance, wherein the gas treatment plant comprises an oxyfuel boiler plant, which comprises:

an oxyfuel boiler,
a pipe arranged for forwarding the industrial waste gas to the oxyfuel boiler and injecting the industrial waste gas into the oxyfuel boiler to participate in the combustion process occurring in the boiler to cause oxidation of at least a portion of the content of the at least one oxidizable substance of the industrial waste gas,
a gas cleaning system, and
a pipe for forwarding a carbon dioxide rich flue gas generated in the boiler as an effect of the combustion process to the gas cleaning system for being cleaned therein, such that an at least partly cleaned carbon dioxide rich flue gas is formed.

An advantage of this gas treatment plant is that large volume flows of industrial waste gases can be treated in an environmentally friendly manner, at the same time as electrical power is produced.

According to one embodiment the gas treatment plant further comprises a pipe for forwarding at least a portion of the industrial waste gas as a first flow of dilution gas to a mixing device for mixing the at least a portion of the industrial waste gas with a fuel, and a further pipe for forwarding the mixture of the at least a portion of the industrial waste gas and the fuel to the boiler for being combusted therein. An advantage of this embodiment is that an efficient process scheme for preparing fuel for the combustion is obtained.

According to one embodiment the gas treatment plant further comprises a pipe for forwarding at least a portion of the industrial waste gas as a second flow of dilution gas to the boiler to form an oxidant gas mixture with an oxygen gas forwarded to the boiler via a pipe for combusting a fuel in the boiler. An advantage of this embodiment is that an oxidant gas mixture for the oxyfuel boiler is obtained in a manner which is very efficient and which requires little or no extra equipment compared to an oxyfuel boiler operating with recirculation of carbon dioxide rich flue gas. According to one embodiment pipes are arranged for forming an oxidant gas mixture upstream of the boiler. According to one embodiment, a pipe may be arranged for forwarding oxygen, in part or in the whole, directly to the boiler, for example for the purpose of operating the boiler at a higher oxygen gas concentration than what might be suitable for the mixture of industrial waste gas and oxygen gas. According to one embodiment, a pipe may be arranged for forwarding at least a portion of the industrial waste gas directly to the boiler. Thus, pipes could be arranged for forming the oxidant gas mixture of oxygen gas and industrial waste gas upstream of the boiler and/or for forming an oxidant gas mixture inside of the boiler.

There is, furthermore, provided a combined process plant comprising at least one syngas plant and a gas treatment plant of the type described hereinbefore, wherein a pipe is arranged for forwarding a waste gas generated in the syngas plant and comprising at least 50% by volume of carbon dioxide and at least one oxidizable substance to the gas treatment plant for being treated therein. An advantage of this combined process plant is that efficient production of synthetic gas products of the syngas plant is combined with the efficient energy production and efficient gas cleaning of the oxyfuel boiler plant, to generate together a combined plant being both economically efficient and environmentally friendly.

Further objects and features of the present invention will be apparent from the description and the claims.

BRIEF DESCRIPTION OF THE DRAWINGS

The invention will now be described in more detail with reference to the appended drawings in which.

DESCRIPTION OF PREFERRED EMBODIMENTS

Figure 1:
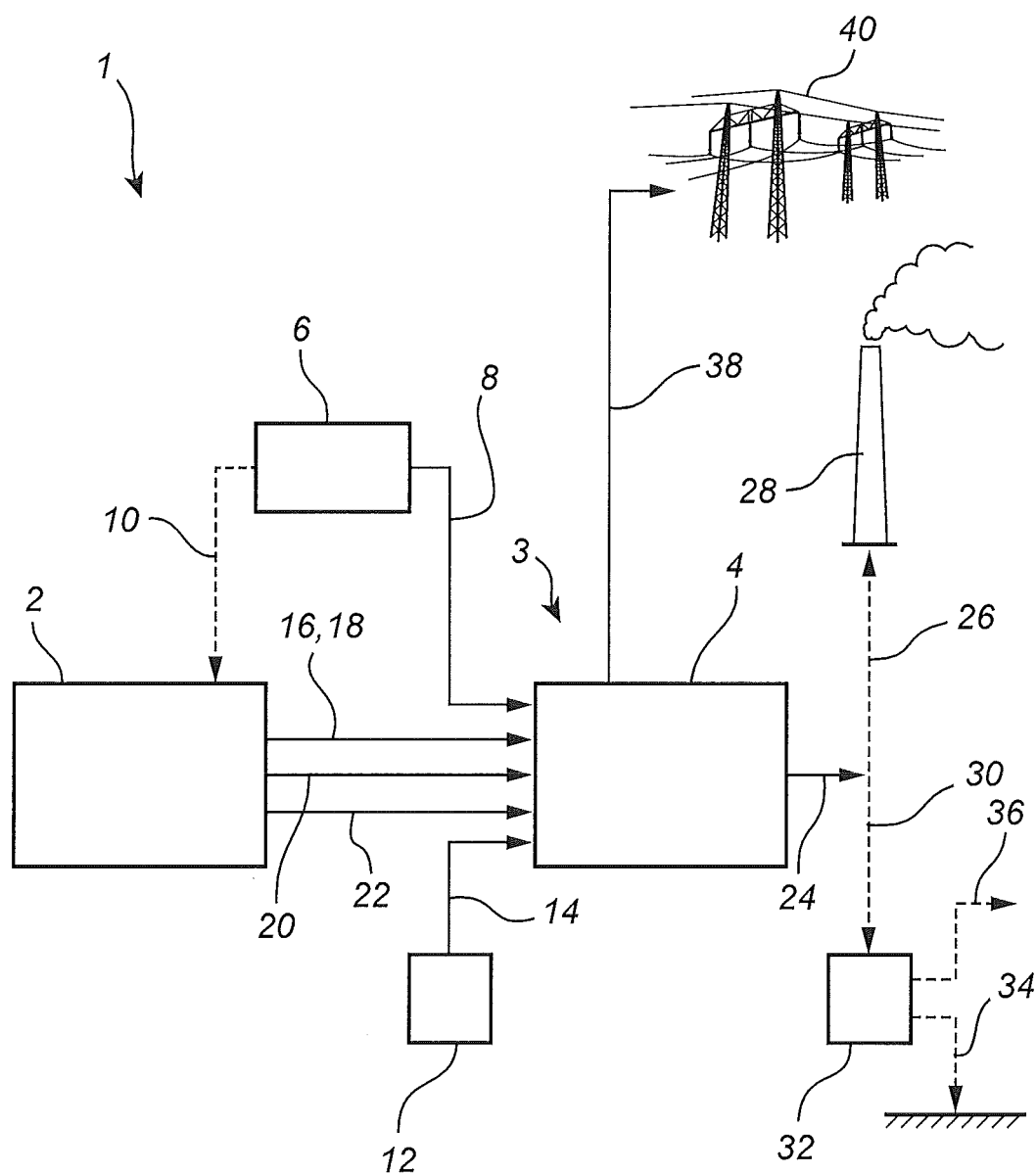
FIG. 1 is a schematic illustration of a combined process plant comprising a syngas plant combined with an oxyfuel boiler plant.

FIG. 1 is a schematic representation of a combined process plant 1. The combined process plant 1 comprises an industrial process plant 2 in which chemical processes occur and which is, in this embodiment, a syngas plant. Furthermore, the combined process plant 1 comprises a gas treatment plant 3 for treating one or more industrial waste gases generated in the syngas plant 2. In this embodiment the gas treatment plant 3 comprises an oxyfuel boiler plant 4.

An oxygen supply system 6 is arranged for generating an oxygen gas that is forwarded, via pipe 8, to the oxyfuel boiler plant 4. The oxygen supply system 6 could, for example, be an air separating unit (ASU) which separates oxygen gas, $O_2$, from nitrogen, $N_2$, of an ambient air stream and produces an oxygen stream, or the oxygen supply system 6 could be an oxygen separating membrane, an oxygen storage tank, or any other source for providing oxygen. The oxygen stream forwarded via pipe 8 comprises, typically, at 90-99.9 vol. % of oxygen gas. Optionally, a further air stream is forwarded, via a pipe 10, to the syngas plant 2 for use therein, as will be described in more detail hereinafter.

A fuel in the form of, for example, coal or oil is forwarded from a fuel storage 12 via a pipe 14 to the oxyfuel boiler plant 4 for being combusted therein.

The oxyfuel boiler plant 4 is, furthermore, supplied with various waste streams from the syngas plant 2 and treats those waste streams in a manner which will be described in more detail hereinafter. These waste streams forwarded from the syngas plant 2 to the oxyfuel boiler plant 4 may comprise, among others, industrial waste gas streams comprising carbon dioxide forwarded via pipes 16, 18, a hydrocarbon containing waste stream, which may be in a gaseous, liquid, or solid form, forwarded via pipe 20, and an ammonia containing stream forwarded via pipe 22.

According to one embodiment at least one of the industrial waste gas streams forwarded via pipe 16 and/or 18 comprises at least 50%, preferably at least 75%, and more preferably at least 90%, by volume of carbon dioxide, and at least one oxidizable substance. By "oxidizable substance" is meant a substance which may undergo an oxidation reaction when present in the combustion process occurring in a boiler of the oxyfuel boiler plant 4.

In the oxyfuel boiler plant 4 the industrial gas streams comprising carbon dioxide forwarded via pipes 16, 18, and the hydrocarbon containing waste stream forwarded via pipe 20 are exposed to combustion followed by a cleaning of a flue gas generated by the combustion, as will be described in more detail hereinafter. Preferably, at least 75% of the content of at least one oxidizable substance of the industrial waste gas stream forwarded via pipe 16 and/or 18 undergoes oxidation when exposed to combustion in the oxyfuel boiler plant 4. Furthermore, preferably at least 75% of the content of hydrocarbons of the hydrocarbon containing waste stream forwarded via pipe 20 undergoes oxidation when exposed to combustion in the oxyfuel boiler plant 4. The ammonia containing stream forwarded via pipe 22 may be utilized in the cleaning of the flue gas. The oxyfuel boiler plant 4 generates a cleaned flue gas comprising mainly carbon dioxide, which leaves the oxyfuel boiler plant 4 via a pipe 24. The pipe 24 may, in accordance with a first embodiment, forward the cleaned flue gas, via a pipe 26, to a stack 28, via which the cleaned flue gas is released to the atmosphere.

According to a second embodiment the pipe 24 may forward the cleaned flue gas, via a pipe 30, to a gas processing unit (GPU) 32 which may, in this embodiment, form part of the gas treatment plant 3. In the GPU 32 the cleaned flue gas is exposed to compression in several stages, further cleaning with regard to pollutants, and drying, i.e., a reduction in the amount of vapour. An example of a GPU is disclosed in FIG. 5 of EP 2 457 637 A1. The resulting gas is a relatively pure compressed carbon dioxide gas, typically comprising 99% by volume, or more, of $CO_2$, at a pressure of, for example, 50 to 300 bar (absolute pressure), more preferably 100-200 bar (absolute pressure). The relatively pure compressed carbon dioxide gas can be forwarded, via a pipe 34, to carbon dioxide sequestration, and/or could be forwarded, via a pipe 36, to an industrial installation being in need of pure carbon dioxide gas. One example of a reuse of the compressed carbon dioxide is enhanced oil recovery (EOR). In EOR the carbon dioxide is injected into an oil well for the purpose of extracting more oil from the well. Potentially, the carbon dioxide could be left in the oil well afterwards, which means that the EOR would, in such a case, involve a reuse of carbon dioxide followed by a carbon dioxide sequestration.

According to a further embodiment, a first portion of the cleaned flue gas is forwarded, via pipes 24, 26, to stack 28 for release to the atmosphere, and a second portion of the cleaned flue gas is forwarded, via pipes 24, 30, to the GPU 32 and further via pipe 34 and/or 36 to sequestration and/or reuse.

The oxyfuel boiler plant 4 generates electrical power which, via cable system 38, is directed to, for example, a national power grid 40, or another user of electric power.

Figure 2:
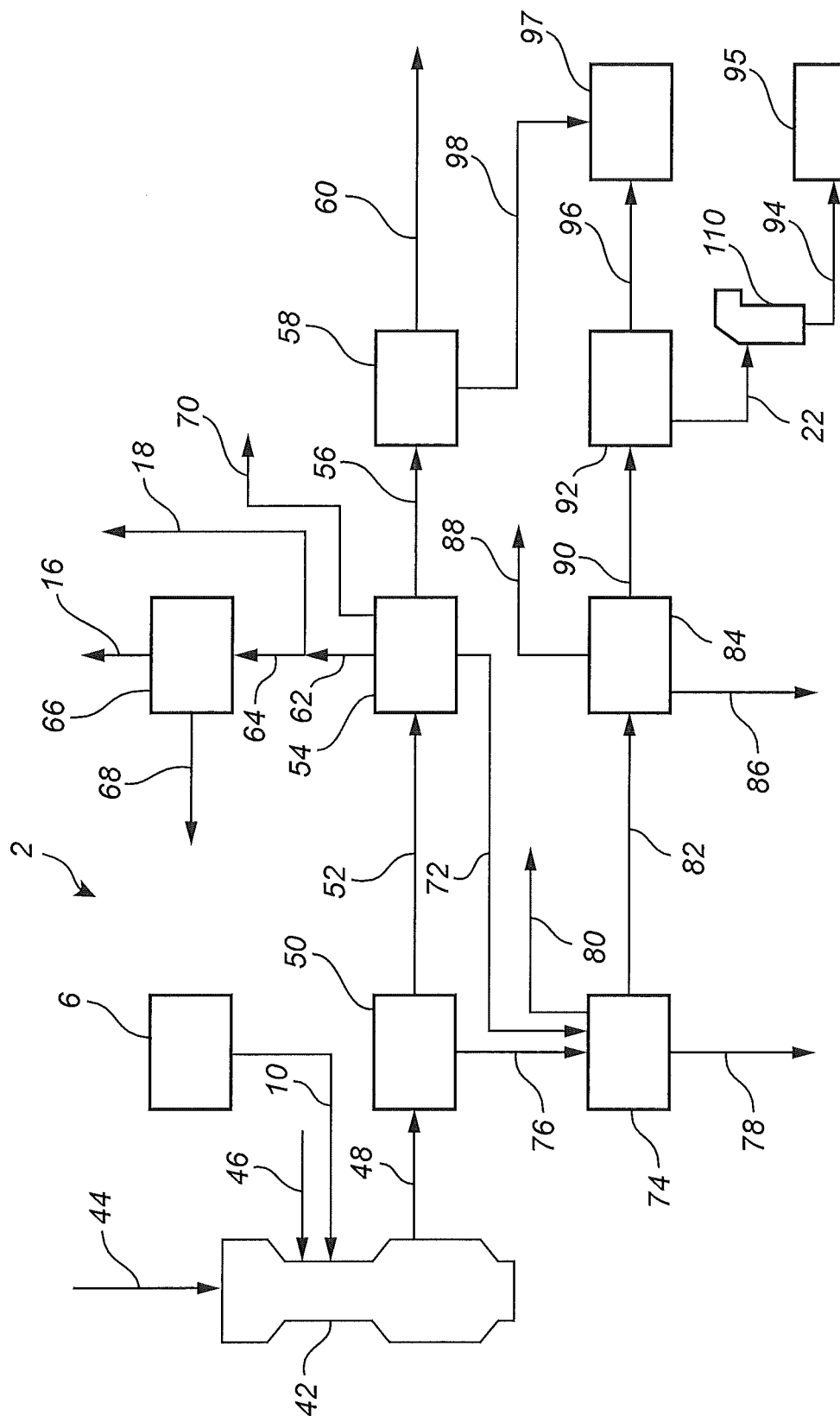
FIG. 2 is a schematic side view illustrating in more detail the syngas plant of FIG. 1.

FIG. 2 illustrates, schematically, the syngas plant 2 in more detail. The syngas plant 2 comprises a gasifier 42. Coal is supplied to the gasifier 42 via a pipe 44, water, which may be in the form of steam, is supplied to the gasifier 42 via a pipe 46, and oxygen gas is supplied via, for example, the pipe 10 forwarding oxygen gas from the ASU 6. The gasification reaction in the gasifier 42 forms a crude gas, which comprises $CO$, $H_2$, $CO_2$, $CH_4$, other hydrocarbons, $H_2S$, $NH_3$, and various other impurities. The crude gas is forwarded, via a pipe 48, from the gasifier 42 to a crude gas cooler 50. In the crude gas cooler 50 the crude gas is cooled, which results in condensation of some hydrocarbons and impurities. Cooled crude gas is forwarded, via a pipe 52, to a syngas cleaning device 54. The syngas cleaning device 54 may, for example, be a Rectisol™ plant, which is available from Lurgi GmbH, DE. In the syngas cleaning device 54 the cooled crude syngas is treated with methanol to remove, among other components, $CO_2$, $H_2S$, $NH_3$, and phenols. A cleaned crude gas is forwarded, via a pipe 56, to a synthesis plant 58, which may be of the above mentioned Fischer-Tropsch type. The useful end products of the synthesis plant 58 may be town gas, liquefied pressurized gas, fuel oil, petrochemicals, etc. that leave the synthesis plant 58 via a symbolically illustrated pipe 60.

The syngas cleaning device 54 produces a raw waste gas stream which comprises, typically, at least 85% by volume of $CO_2$, 1-2% by volume of $H_2S$, and minor amounts of other impurities. The raw waste gas stream typically comprises less than 0.5%, more often less than 0.1%, by volume of water vapour, and is, hence, a relatively dry gas. This raw waste gas stream comprising carbon dioxide is forwarded from the syngas cleaning device 54 via pipe 62. Optionally, at least a portion, or even the entire flow, of the raw waste gas stream could be forwarded, via pipe 18, from the syngas cleaning device 54 to the oxyfuel boiler plant 4 for being treated therein, as will be described in more detail hereinafter. The remaining portion, if any, or the entire flow, of the raw waste gas stream comprising carbon dioxide is forwarded, via a pipe 64, to a raw waste gas cleaning plant 66. The raw waste gas cleaning plant 66 may be a Sulfolin™ plant, which is available from Linde AG, DE. In the raw waste gas cleaning plant 66 hydrogen sulphide, $H_2S$, of the raw waste gas stream is captured and oxidized in a wet process. A sulphur containing stream leaves the raw waste gas cleaning plant 66 via a pipe 68 and may be used for forming, for example, sulphuric acid. A cleaned waste gas stream comprising, typically, at least 70% by volume of $CO_2$, and still some $H_2S$, and other impurities, and also up to 15% by volume of water vapour, is forwarded from the raw waste gas cleaning plant 66 to the oxyfuel boiler plant 4 via pipe 16 for being treated therein as will be described hereinafter.

The syngas cleaning device 54 may, furthermore, generate a flash gas, containing some hydrocarbons and various contaminants, which is forwarded from the syngas cleaning device 54 via a pipe 70, and which may be incorporated with the hydrocarbon containing waste stream supplied to the oxyfuel boiler plant 4 via the pipe 20 illustrated in FIG. 1. Still further, the syngas cleaning device 54 may generate a hydrocarbon waste stream containing higher hydrocarbons, for example hydrocarbons containing 4-10 carbon atoms. This hydrocarbon waste stream is forwarded, via a pipe 72, from the syngas cleaning device 54 to a gas/liquid separator 74. The gas/liquid separator 74 also receives a waste stream comprising, among other components, hydrocarbons forwarded from the crude gas cooler 50 via a pipe 76. The gas/liquid separator 74 may form a tar and tar oil stream, which is forwarded from the gas/liquid separator 74 via a pipe 78, and which may be incorporated with the hydrocarbon containing waste stream of pipe 20 illustrated in FIG. 1. The gas/liquid separator 74 may also form a flash gas stream, containing various gaseous components, such as $CO_2$, $NH_3$, and $H_2S$, which is forwarded from the gas/liquid separator 74 via a pipe 80, and which may be incorporated with the hydrocarbon containing waste stream of pipe 20, and/or with one of the industrial waste gas streams of pipes 16, 18 illustrated in FIG. 1.

A stream of gas liquor is forwarded, via a pipe 82, from the gas/liquid separator 74 to a phenol separation plant 84. The phenol separation plant may, for example, be a Phenosolvan™ plant, as designed by Lurgi GmbH, DE. A stream of phenols leaves the phenol separation plant 84 via a pipe 86, and may be sent for further treatment. A vent gas stream is forwarded from the phenol separation plant 84 via a pipe 88 and may be incorporated with the hydrocarbon containing waste stream of pipe 20 illustrated in FIG. 1. An aqueous residue stream may be forwarded, via a pipe 90, from the phenol separation plant 84 to an ammonia stripper 92. In the ammonia stripper 92 the aqueous residue stream is exposed to elevated pressures and temperatures for evaporating ammonia, $NH_3$, and subsequently condensing the ammonia to obtain a stream of relatively pure ammonia in an aqueous solution. The ammonia stream may, optionally, be forwarded from the ammonia stripper, via the pipe 22, to a wet scrubber 110 forming part of the oxyfuel boiler plant 4. In the wet scrubber 110 the ammonia stream reacts with sulphur dioxide, as will be described in more detail, and forms ammonia sulphate. The ammonia sulphate may be forwarded from the wet scrubber 110, via a pipe 94, to an ammonia sulphate plant 95 for preparation of, for example, a fertilizer. An aqueous residue stream from the ammonia stripper 92 is forwarded, via a pipe 96, to a biological treatment plant 97, in which the residues are decomposed. An aqueous residue stream from the synthesis plant 58 may also be forwarded, via a pipe 98, to the biological treatment plant 97 for decomposition thereof.

Figure 3:
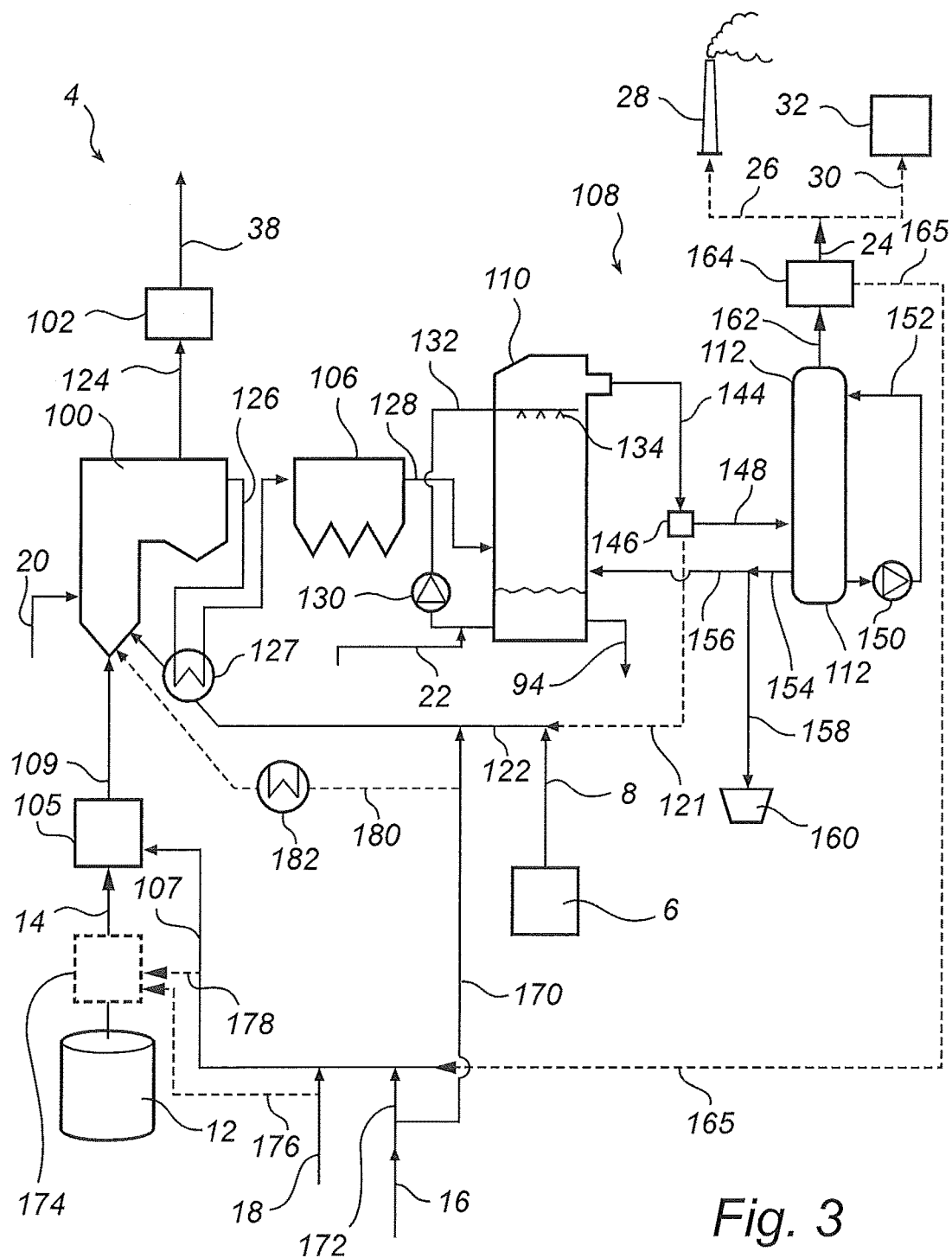
FIG. 3 is a schematic side view illustrating in more detail the oxyfuel boiler plant of FIG. 1.

FIG. 3 illustrates the oxyfuel boiler plant 4 in more detail. The oxyfuel boiler plant 4 comprises, as main components, an oxyfuel boiler 100, a steam turbine, schematically indicated as 102, a particulate removal device in the form of, for example, an electrostatic precipitator 106, and a gas cleaning system 108. The gas cleaning system 108 may comprise a first gas cleaning device in the form of the wet scrubber 110, and a second gas cleaning device in the form of a condenser 112. It will be appreciated that the gas cleaning system 108 may also comprise further and/or alternative components, such as a selective catalytic (SCR) reduction plant for removing nitrogen oxides, and a fabric filter for improved removal of trace pollutants, such as mercury and cadmium. An example of an SCR reduction plant can be found in U.S. Pat. No. 6,146,605, and an example of a fabric filter can be found in U.S. Pat. No. 4,336,035.

A fuel, such as coal or oil, is contained in the fuel storage 12, and can be forwarded to the boiler 100 via the pipe 14. In case the fuel is coal, a coal mill 105 may be connected to the pipe 14 for pulverizing the coal. The coal mill 105 may be supplied with a first flow of dilution gas, which contains carbon dioxide, via a pipe 107. The coal mill 105 has, in addition to its function of pulverizing the coal, also the function of being a mixing device mixing coal and the first flow of dilution gas. The mixture of pulverized coal and the first flow of dilution gas is forwarded, via a pipe 109, from the coal mill 105 to the boiler 100 for being combusted therein. It will be appreciated that other types of mixing devices can be utilized as well, for example when a liquid fuel is used. Preferably, the first flow of dilution gas forwarded to the coal mill 105 via the pipe 107 contains less than about 15%, more preferably less than 5%, by volume of water vapour, because water vapour may have a negative effect on the operation of the coal mill 105.

A duct 122 is operative for forwarding a second flow of dilution gas, which contains carbon dioxide, to the boiler 100. The air separating unit (ASU) 6 is operative for providing oxygen gas as described hereinbefore. The supply duct 8 is operative for forwarding the produced oxygen gas, comprising typically 90-99.9 vol. %, or even more, of oxygen, $O_2$, to the duct 122 upstream of the boiler 100, such that oxygen gas and the second flow of dilution gas, which contains carbon dioxide, may become mixed with each other to form an oxidant gas mixture containing typically about 15-75% by volume of oxygen gas, the balance being mainly carbon dioxide and water vapour, upstream of the boiler 100. Since almost no air enters the boiler 100 there is almost no nitrogen gas supplied to the boiler 100. In practical operation, less than 3% by volume of the total gas volume supplied to the boiler 100 is air, which mainly enters the boiler 100 as a leakage of air.

The coal, which is mixed with the first flow of dilution gas and is supplied to the boiler 100 via the pipe 109, is combusted in the boiler 100 in the presence of the oxidant gas mixture comprising oxygen gas mixed with the second flow of dilution gas and supplied via the duct 122. As a result of the combustion in the boiler 100 steam is produced, and that steam is forwarded, via a steam pipe 124, to the steam turbine 102, which is operative for generating power in the form of electric power directed to, for example, the national power grid via the cable system 38.

A duct 126 is operative for forwarding carbon dioxide rich flue gas generated in the boiler 100 to the electrostatic precipitator 106. By "carbon dioxide rich flue gas" is meant that the flue gas leaving the boiler 100 via the duct 126 will contain at least 40% by volume of carbon dioxide, $CO_2$. Often more than 50% by volume of the flue gas leaving the boiler 100 will be carbon dioxide. The balance of the "carbon dioxide rich flue gas" will be about 20-50% by volume of water vapour ($H_2O$), 2-7% by volume of oxygen ($O_2$), since a slight oxygen excess is often preferred in the boiler 100, and totally about 0-10% by volume of other gases, including mainly nitrogen ($N_2$) and argon (Ar), since some leakage of air can seldom be completely avoided.

Optionally, a gas/gas heat exchanger 127 may be arranged for transferring heat from the carbon dioxide rich flue gas leaving the boiler 100 via the duct 126 to the oxidant gas supplied to the boiler 100 via the duct 122.

The electrostatic precipitator 106, which may be of a type which is per se known from, for example, U.S. Pat. No.

4,502,872, and which may form part of the gas cleaning system 108, removes most of the dust particles from the carbon dioxide rich flue gas. As alternative to an electrostatic precipitator a fabric filter, which is per se known from, for example, U.S. Pat. No. 4,336,035, may be utilized for removing the dust particles. A duct 128 is operative for forwarding the carbon dioxide rich flue gas from the electrostatic precipitator 106 to the wet scrubber 110 of the gas cleaning system 108.

The wet scrubber 110 may, for example, be of the tower scrubber type, a scrubber type which is per se known from, for example, EP 0 162 536, or of another type, for example a bubbling bed scrubber, an example of which is disclosed in WO 2005/007274. In FIG. 3 a tower type of wet scrubber 110 is illustrated. The wet scrubber 110, which is operative for removing at least a portion, and preferably at least 80%, of the sulphur dioxide content of the carbon dioxide-rich flue gas coming from the boiler 100 via the electrostatic precipitator 106, comprises a circulation pump 130 which is operative for circulating, in a slurry circulation pipe 132, an ammonia sulphate liquid from the bottom of the wet scrubber 110 to a set of nozzles 134 arranged in the upper portion of the wet scrubber 110. The slurry nozzles 134 are operative for finely distributing the liquid in the wet scrubber 110 and to achieve good contact between the liquid and the flue gas being forwarded to the wet scrubber 110 via the duct 128 and flowing substantially vertically upwards inside the wet scrubber 110. Fresh ammonia solution is supplied to the circulation pipe 132 from the ammonia stripper 92 of the syngas plant 2 illustrated in FIG. 2 via the pipe 22. In the wet scrubber 110, sulphur dioxide, $SO_2$, contained in the flue gas reacts with the ammonia, $NH_3$, to form ammonium sulphate, $(NH_4)_2SO_4$. The ammonium sulphate formed is removed from the wet scrubber 110 via the pipe 94 and is forwarded to the ammonia sulphate plant 95 of the syngas plant 2 illustrated in FIG. 2.

In accordance with an alternative embodiment, the wet scrubber 110 uses another type of alkali for removing sulphur dioxide. For example, the wet scrubber may be a limestone scrubber in which limestone, $CaCO_3$, is supplied to react with sulphur dioxide, $SO_2$, to form calcium sulphite, $CaSO_3$, which is subsequently oxidized to form gypsum, $CaSO_4$.

A partly cleaned carbon dioxide rich flue gas leaves the wet scrubber 110 via a duct 144 which forwards the flue gas to an optional first gas distribution point 146. At the gas distribution point 146, being located between the wet scrubber 110 and the condenser 112, as seen with respect to the direction of the flow of the partly cleaned carbon dioxide rich flue gas, the partly cleaned carbon dioxide rich flue gas may be divided into two portions, namely a first flow, which via a duct 121 is forwarded to the duct 122 and is recirculated back to the boiler 100, and a second flow, which via a duct 148 is forwarded to the condenser 112.

The condenser 112 is provided with a circulation pump 150 which is operative for circulating a cooling liquid, via a circulation pipe 152, in the condenser 112. The cooling liquid being circulated in the condenser 112 cools the partly cleaned carbon dioxide rich flue gas to a temperature which is below its saturation temperature, with respect to water vapour, and, hence, causes a condensation of at least a portion of the water vapour content of the partly cleaned carbon dioxide rich flue gas being forwarded from the wet scrubber 110. The condensed water leaves the condenser 112 via a disposal pipe 154. A portion of the condensed water leaving the condenser 112 via the pipe 154 may be forwarded to the wet scrubber 110 via a pipe 156 as make up water. A further portion of the condensed water may be forwarded, via a pipe 158, to a water treatment unit 160, in which the condensed water is treated prior to being re-used in the process, for example as boiler water, or being disposed of.

The cleaned carbon dioxide rich flue gas leaves the condenser 112 via a duct 162 which forwards the flue gas to an optional second gas distribution point 164. At the gas distribution point 164 the cleaned carbon dioxide rich flue gas may be divided into two portions, namely a first flow, which via a duct 165 is forwarded to the duct 107 and is returned to the boiler 100, via the coal mill 105, and a second flow, which via the duct 24 leaves the oxyfuel boiler plant 4. The gas leaving the oxyfuel boiler plant 4 via the pipe 24 may, as described hereinbefore with reference to FIG. 1, be forward via the pipe 26 to the stack 28, and/or may be forwarded via the pipe 30 to the gas processing unit (GPU) 32.

The cleaned waste gas stream comprising $CO_2$, and still some $H_2S$, and other impurities, forwarded from the raw waste gas cleaning plant 66 of the syngas plant 2 illustrated in FIG. 2 is forwarded to the oxyfuel boiler plant 4 via pipe 16. Optionally, the pipe 16 may forward, via a pipe 170, a first portion of the waste gas stream to the duct 122 operative for forwarding a second flow of dilution gas to the boiler 100. Thereby, the first portion of the cleaned waste gas stream from the raw waste gas cleaning plant 66 of the syngas plant 2 will contribute to the dilution of the oxygen gas supplied from the ASU 6 via the pipe 8 to form the desired mixture of oxygen gas and carbon dioxide to be supplied to the boiler 100 as oxidant gas. Depending on the amount of the cleaned waste gas that is forwarded via the pipe 170, the flow of the partly cleaned carbon dioxide rich flue gas that is recirculated via the duct 121 to the duct 122 may be reduced, or even avoided. Hence, in accordance with a first embodiment, the duct 122 receives cleaned waste gas via the pipe 170 and recirculated partly cleaned carbon dioxide rich flue gas via the duct 121. In accordance with a second embodiment, the duct 122 receives cleaned waste gas via the pipe 170, but no recirculated partly cleaned carbon dioxide rich flue gas via the duct 121. In accordance with a third embodiment, the duct 122 receives recirculated partly cleaned carbon dioxide rich flue gas via the duct 121, but no cleaned waste gas via the pipe 170.

The pipe 16 may, furthermore, forward, via a pipe 172, a second portion of the cleaned waste gas stream to the duct 107 supplying the first flow of dilution gas. Thereby, the second portion of the waste gas stream from the raw waste gas cleaning plant 66 of the syngas plant 2 will be used in the coal mill 105. Depending on the amount of the cleaned waste gas that is forwarded via the pipe 172, the flow of the cleaned carbon dioxide rich flue gas that is recirculated via the duct 165 to the duct 107 may be reduced, or even avoided. Hence, in accordance with a first embodiment, the duct 107 receives cleaned waste gas via the pipe 172 and recirculated cleaned carbon dioxide rich flue gas via the duct 165. In accordance with a second embodiment, the duct 107 receives cleaned waste gas via the pipe 172, but no recirculated cleaned carbon dioxide rich flue gas via the duct 165. In accordance with a third embodiment, the duct 107 receives recirculated cleaned carbon dioxide rich flue gas via the duct 165, but no cleaned waste gas via the pipe 172.

Furthermore, a raw waste gas stream, forwarded from the syngas cleaning device 54 of the syngas plant 2 via pipe 62 and further via pipe 18, may be forwarded to the duct 107 supplying the first flow of dilution gas. The raw waste gas stream comprises comparably high concentrations of $H_2S$ in addition to $CO_2$, but is comparably dry, i.e. has a low concentration of water vapour, which makes it useful in the coal mill 105. The raw waste gas stream forwarded via pipe 18 may reduce, or even eliminate the need for recirculated cleaned carbon dioxide rich flue gas via the duct 165. Hence, in accordance with a first embodiment, the duct 107 receives raw waste gas via the pipe 18 and recirculated cleaned carbon dioxide rich flue gas via the duct 165. In accordance with a second embodiment, the duct 107 receives raw waste gas via the pipe 18, but no recirculated cleaned carbon dioxide rich flue gas via the duct 165. In accordance with a third embodiment, the duct 107 receives recirculated cleaned carbon dioxide rich flue gas via the duct 165, but no raw waste gas via the pipe 18.

Optionally, a coal drier 174 could be arranged along the pipe 14 for drying the coal prior to, or in conjunction with, pulverizing the coal in the coal mill 105. The coal drier 174 is in need of an inert and relatively dry gas, preferably a gas containing less than 5% by volume of water vapour, for drying the coal. Hence, according to a first embodiment, a stream of raw waste gas, being comparably dry, may be forwarded, via the pipe 18 and further via a pipe 176, to the coal drier 174 for drying the coal. According to a further embodiment, a stream of the first flow of dilution gas is forwarded from the pipe 107, and further via a pipe 178, to the coal drier 174 for drying the coal. The coal drier 174 may have, in addition to its function of drying the coal, also the function of being a mixing device mixing coal and the first flow of dilution gas. Optionally, heaters, not shown in FIG. 3 for maintaining clarity of illustration therein, may be provided in the pipes 176, 178 for heating the respective gas prior to entering the coal drier 174.

Optionally, the functions of the coal drier 174 and of the coal mill 105 may be combined into a single device, where drying takes place as the coal is being pulverized. In such a case, the inert and relatively dry gas, forwarded via pipe 176 and/or 178, provides the heat for drying the coal as it is pulverized in the mill and subsequently transports the pulverized coal to the boiler 100 via the pipe 109.

In some situations the mixture of the waste gas stream forwarded from the syngas plant 2 via pipes 16 and 170 with the oxygen gas forwarded from the ASU 6 via the pipe 8 may become explosive. In those situations at least a portion, and optionally the entire flow, of the waste gas stream forwarded via the pipe 170 is forwarded, via a pipe 180, directly to the boiler 100, meaning that mixing with the oxygen gas occurs first when the waste gas stream enters the boiler 100. In such case an additional heat exchanger 182 could be arranged for preheating the waste gas stream of the pipe 180 prior to entering the boiler 100. The heat exchanger 182 could, for example, be heated by hot flue gas from the duct 126, by hot water, or by steam, not shown in FIG. 3 for reasons of maintaining clarity of illustration therein.

According to one embodiment, oxygen gas may, in part or in the whole, be forwarded directly to the boiler 100, to operate the boiler 100 at a higher oxygen gas concentration than what might be suitable for the mixture of the waste gas stream and oxygen gas. Hence, the oxidant gas mixture inside the actual boiler 100 could comprise in the range of 15-75% by volume oxygen gas.

The gas/gas heat exchanger 127 is preferably arranged to minimize leakage of the waste gas stream, that is forwarded from the syngas plant 2 via pipe 170 to the duct 122, into the flue gas stream leaving the boiler 100 via the duct 126, to minimize additional contaminants, such as hydrocarbons, that need to be removed in the GPU 32, and/or to avoid that hydrocarbons and other pollutants are emitted to the atmosphere via the stack 28. Leakage can be avoided by using a tubular gas/gas heat exchanger or by using a regenerative gas/gas heat exchanger, for example a so-called Ljungstrom heat exchanger, with an active leakage reduction system that reduces leakage to, preferably, less than 1%. For example, entrained leakage of waste gas into the flue gas in a regenerative gas/gas heat exchanger 127 may be reduced by blowing a cleaned flue gas, for example such gas as transported in duct 121 and/or 165, into a rotor of the regenerative heat exchanger as the rotor turns from the waste gas sector to the flue gas sector. Direct leakage may be reduced by pressurizing a plenum present between sector plates and the rotor with, for example, such cleaned flue gas as transported in duct 121. Also the heat exchanger 182 and the optional heat exchangers on pipes 176/178 may be designed in this manner, if exchanging heat with flue gas of duct 126.

By forwarding the raw waste gas stream, and/or the cleaned waste gas stream from the syngas plant 2 to the boiler 100 of the oxyfuel boiler plant 4 the requirement for recirculating carbon dioxide rich flue gases internally within the oxyfuel boiler plant 4, via ducts 121 and 165, is reduced, or even eliminated. Furthermore, the impurities, such as $H_2S$, ammonia, and various hydrocarbons, of the raw waste gas stream, and/or the cleaned waste gas stream are combusted in the boiler 100 and are as such eliminated or transferred into a shape that is easily removed. For example, the $H_2S$ content of the raw waste gas stream, and/or the cleaned waste gas stream is in the boiler 100 efficiently oxidized and converted into $SO_2$, which is subsequently efficiently removed from the flue gas in the wet scrubber 110. Also other impurities of the raw waste gas stream, and/or the cleaned waste gas stream are efficiently removed in the gas cleaning system 108 of the oxyfuel boiler plant 4. Furthermore, the carbon dioxide content of the raw waste gas stream, and/or the cleaned waste gas stream is incorporated with the carbon dioxide generated in the boiler 100 and a single stream of clean carbon dioxide is generated, which can be sent for sequestration, be reused, or emitted to the atmosphere.

Various flash gases, hydrocarbon streams, etc, including for example those forwarded via pipes 70, 78, 80 and 88 of the syngas plant 2 as illustrated in FIG. 2, may be forwarded to the boiler 100 via the pipe 20 for being combusted therein. Thereby, those waste streams contribute to the electricity production in the boiler 100, and the resulting flue gases formed therefrom are efficiently cleaned in the gas cleaning system 108 of the oxyfuel boiler plant 4.

Hence, the oxyfuel boiler plant 4 acts as a cleaning plant that transforms, by combustion in the boiler 100, harmful components of the waste gases supplied thereto to a form which may either be efficiently removed in the gas cleaning system 108, or which are relatively harmless and may be released to the ambient, or sent for sequestration. An example of the first mentioned type of components is hydrogen sulphide, $H_2S$, which is transformed to $SO_2$ and subsequently removed in the wet scrubber 110 as mentioned above. Further examples of the first mentioned type of components include, but is not limited to, mercaptans, COS, $CS_2$, and other carbon sulphides. These substances are normally available in trace amounts and also generate $SO_2$ upon combustion. Examples of the second type of components include hydrogen, $H_2$, hydrocarbons, $C_xH_y$, ammonia, $NH_3$, carbon monoxide, CO, and further organic substances, such as aldehydes, ketones, etc. that are transformed to relatively harmless substances such as water, $H_2O$, nitrogen, $N_2$, and carbon dioxide, $CO_2$ upon combustion. The combustion of the waste gases also results in an increased energy production, utilizing the heat value of, for example, hydrocarbons and carbon monoxide, in the boiler 100 for electricity production.

It will be appreciated that numerous variants of the embodiments described above are possible within the scope of the appended claims.

Hereinbefore it has been described that the industrial process plant 2 in which chemical processes occur is a syngas plant. It will be appreciated that the industrial process plant could be of another type, and involve other chemical processes. On example of such other chemical processes are the aluminium reduction processes reducing aluminium oxides to metallic aluminium by electrolysis in aluminium smelter plants. Such plants generate industrial waste gases comprising carbon dioxide, carbon monoxide, and various hydrocarbons, such as tars. Those industrial waste gases could also be treated in the plant and by the method described hereinabove. Further examples of chemical processes involve reduction of iron oxide in iron manufacturing plants, resulting in waste gases comprising carbon dioxide, carbon monoxide and other substances. Still further examples of chemical processes include cracker plants and similar plants arranged for refining liquid petroleum products and producing waste gases comprising, for example, carbon dioxide and hydrocarbons.

Furthermore, it has been described hereinbefore, with reference to FIGS. 2 and 3, that particular waste gas streams are extracted at certain positions of the syngas plant 2 and are injected in certain positions in the oxyfuel boiler plant 4. It will be appreciated that waste gas streams may be extracted at other positions of the syngas plant 2 and/or that waste gas streams may be injected at other positions of the oxyfuel boiler plant 4.

To summarize, a gas treatment plant 3 for treating an industrial waste gas comprising carbon dioxide comprises an oxyfuel boiler 100 and a pipe 109; 122; 180 arranged for forwarding the industrial waste gas to the oxyfuel boiler 100 and injecting the industrial waste gas into the oxyfuel boiler 100 to participate in the combustion process occurring in the boiler 100 to cause oxidation of at least a portion of the content of at least one oxidizable substance of the industrial waste gas. The gas treatment plant 3 further comprises a gas cleaning system 108, and a pipe 126 for forwarding a carbon dioxide rich flue gas generated in the boiler 100 to the gas cleaning system 108 for being cleaned therein, such that an at least partly cleaned carbon dioxide rich flue gas is formed.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of treating an industrial waste gas generated in a chemical process and comprising at least 50% by volume of carbon dioxide and at least one oxidizable substance, the method comprising:

mixing a first portion of the industrial waste gas with an oxygen gas to form an oxidant gas mixture;

forwarding the industrial waste gas and the oxidant gas mixture to an oxyfuel boiler plant, the oxyfuel boiler plant comprising an oxyfuel boiler fed with fuel and recirculated carbon dioxide;

injecting the industrial waste gas and the oxidant gas mixture into the oxyfuel boiler of the oxyfuel boiler plant and making the industrial waste gas and the oxidant gas mixture participate in a combustion process occurring in the oxyfuel boiler from combustion of the fuel being present in the oxyfuel boiler to cause oxidation of at least a portion of content of the at least one oxidizable substance of the industrial waste gas;

generating a carbon dioxide rich flue gas in the oxyfuel boiler as an effect of the combustion process that involves participation of the injected industrial waste gas and the oxidant gas mixture, the carbon dioxide rich flue gas comprising at least 40% by volume of carbon dioxide;

cleaning the carbon dioxide rich flue gas in a gas cleaning system of the oxyfuel boiler plant to form an at least partly cleaned carbon dioxide rich flue gas, and utilizing a second portion of the industrial waste gas as a first flow of dilution gas and mixing the second portion of the industrial waste gas with the fuel prior to injecting the second portion of the industrial waste gas into the oxyfuel boiler for being combusted therein.

2. A method according to claim 1, further comprising utilizing the first portion of the industrial waste gas as a second flow of dilution gas and mixing the first portion of the industrial waste gas with the oxygen gas to form the oxidant gas mixture, and injecting the oxidant gas mixture into the oxyfuel boiler for combusting the fuel therein.

3. A method according to claim 1, further comprising forwarding the at least partly cleaned carbon dioxide rich flue gas formed in the gas cleaning system of the oxyfuel boiler plant to a gas processing unit for forming a clean carbon dioxide stream suitable for carbon dioxide ($CO_2$) sequestration and/or reuse.

4. A method according to claim 1, wherein at least one further industrial waste gas stream, which comprises at least one hydrocarbon substance, is forwarded to the oxyfuel boiler for being combusted therein.

5. A method according to claim 1, wherein the gas cleaning system comprises a wet scrubber for removing at least one acid substance from the carbon dioxide rich flue gas generated in the oxyfuel boiler.

6. A method according to claim 5, wherein an ammonia stream is forwarded to the wet scrubber for reacting with sulphur dioxide of the carbon dioxide rich flue gas to form ammonium sulphate.

7. A method according to claim 1, wherein at least the industrial waste gas, generated in the chemical process and comprising the at least 50% by volume of carbon dioxide and the at least one oxidizable substance, is generated in a syngas plant and comprises, as one oxidizable substance, hydrogen sulphide ($H_2S$).

8. A gas treatment plant for treating an industrial waste gas generated in a chemical process and comprising at least 50% by volume of carbon dioxide and at least one oxidizable substance, the gas treatment plant comprising an oxyfuel boiler plant, which comprises:

an oxyfuel boiler fed with fuel and recirculated carbon dioxide, a pipe arranged for forwarding first portion of the industrial waste gas to the oxyfuel boiler to form an oxidant gas mixture with an oxygen gas;

a pipe arranged for forwarding the industrial waste gas to the oxyfuel boiler and injecting the industrial waste gas and the oxidant gas mixture into the oxyfuel boiler to participate in a combustion process occurring in the oxyfuel boiler from combustion of the fuel fed to the oxyfuel boiler to cause oxidation of at least a portion of content of the at least one oxidizable substance of the industrial waste gas and generation of a carbon dioxide rich flue gas as an effect of the combustion process that involves participation of the injected industrial waste gas and the oxidant gas mixture, the carbon dioxide rich flue gas comprising at least 40% by volume of carbon dioxide, a gas cleaning system, a pipe for forwarding the carbon dioxide rich flue gas generated in the oxyfuel boiler as the effect of the combustion process to the gas cleaning system for being cleaned therein, such that an at least partly cleaned carbon dioxide rich flue gas is formed, and a pipe for forwarding a second portion of the industrial waste gas as a first flow of dilution gas to a mixing device for mixing the second portion of the industrial waste gas with the fuel, and a further pipe for forwarding the mixture of the second portion of the industrial waste gas and the fuel to the oxyfuel boiler for being combusted therein.

9. A gas treatment plant according to claim 8, wherein the gas treatment plant further comprises a pipe for forwarding the first portion of the industrial waste gas as a second flow of dilution gas to the oxyfuel boiler to form the oxidant gas mixture with the oxygen gas, the oxidant gas mixture being forwarded to the oxyfuel boiler via a pipe for combusting the fuel in the oxyfuel boiler.

10. A gas treatment plant according to claim 8, further comprising a gas processing unit and a pipe for forwarding the at least partly cleaned carbon dioxide rich flue gas generated in the gas cleaning system to the gas processing unit for forming a clean carbon dioxide stream suitable for carbon dioxide ($CO_2$) sequestration and/or reuse.

11. A gas treatment plant according to claim 8, further comprising a pipe for forwarding at least one further industrial waste gas stream, which comprises at least one hydrocarbon substance, to the oxyfuel boiler for being combusted therein.

12. A gas treatment plant according to claim 8, wherein the gas cleaning system of the oxyfuel boiler plant comprises at least one ammonia type wet scrubber for removing sulphur dioxide from the carbon dioxide rich flue gas.

13. A combined process plant comprising at least one syngas plant and a gas treatment plant according to claim 8, wherein a pipe is arranged for forwarding a waste gas generated in the syngas plant and comprising at least 50% by volume of carbon dioxide and at least one oxidizable substance to the gas treatment plant for being treated therein.

14. A method according to claim 1, wherein the gas cleaning system comprises at least one of a wet scrubber, a selective catalytic reduction plant, and a fabric filter.

15. A method according to claim 1, comprising:

feeding the fuel to the oxyfuel boiler of the oxyfuel boiler plant, and combusting the fuel via the oxyfuel boiler of the oxyfuel boiler plant in the presence of the recirculated carbon dioxide such that the industrial waste gas participates in the combustion of the fuel occurring in the oxyfuel boiler.

16. A method according to claim 15, wherein the fuel is comprised of coal or oil.

17. A method according to claim 16, wherein the fuel is coal, the method comprising:

pulverizing the coal prior to feeding the coal to the oxyfuel boiler of the oxyfuel boiler plant for combustion of the coal.

18. A method according to claim 15, comprising:

mixing oxygen from an air separation unit with the at least partly cleaned carbon dioxide rich flue gas that is output from the gas cleaning system before that mixture is fed to the oxyfuel boiler of the oxyfuel boiler plant, and feeding the mixture of oxygen and the at least partly cleaned carbon dioxide rich flue gas output from the gas cleaning system to the oxyfuel boiler of the oxyfuel boiler plant for combustion of the fuel in the oxyfuel boiler.

19. A method according to claim 1, wherein the industrial waste gas is injected to replace, at least partly, carbon dioxide output from the oxyfuel boiler that is recirculated internally within the oxyfuel boiler plant.

* * * * *

UNITED STATES PATENT AND TRADEMARK OFFICE
CERTIFICATE OF CORRECTION

PATENT NO. : 9,644,840 B2
APPLICATION NO. : 13/623521
DATED : May 9, 2017
INVENTOR(S) : Koss et al.

It is certified that error appears in the above-identified patent and that said Letters Patent is hereby corrected as shown below:

On the Title Page

On Page 2, in Item (56), under "OTHER PUBLICATIONS", in Column 2, Line 2, delete "Enviormental" and insert -- Enviornmentally --, therefor.

In the Claims

In Column 15, Line 3, in Claim 8, delete "gas;" and insert -- gas, --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*